United States Patent
Zhao et al.

(10) Patent No.: US 11,260,371 B2
(45) Date of Patent: Mar. 1, 2022

(54) SELECTIVE CATALYTIC REDUCTION (SCR) CATALYST COMPRISING A COMPOSITE OXIDE CONTAINING V AND SB, PREPARATION PROCESS THEREOF, AND USE THEREOF FOR NITROGEN OXIDES REMOVAL

(71) Applicants: BASF Corporation, Florham Park, NJ (US); BASF SE, Ludwigshafen (DE)

(72) Inventors: Feng Zhao, Shanghai (CN); Jia Di Zhang, Shanghai (CN); Liang Chen, Shanghai (CN); Diana Carolina Galeano Nunez, Ludwigshafen (DE); Sabine Huber, Ludwigshafen (DE); Edgar Viktor Huennekes, Hannover (DE)

(73) Assignee: BASF CORPORATION, Florham Park, NJ (US)

( * ) Notice: Subject to any disclaimer, the term of this patent is extended or adjusted under 35 U.S.C. 154(b) by 244 days.

(21) Appl. No.: 16/062,242

(22) PCT Filed: Jul. 26, 2016

(86) PCT No.: PCT/CN2016/091711
§ 371 (c)(1),
(2) Date: Jun. 14, 2018

(87) PCT Pub. No.: WO2017/101449
PCT Pub. Date: Jun. 22, 2017

(65) Prior Publication Data
US 2018/0304236 A1    Oct. 25, 2018

(30) Foreign Application Priority Data
Dec. 17, 2015   (WO) ................ PCT/CN2015/097704

(51) Int. Cl.
*B01J 23/22*   (2006.01)
*B01D 53/94*   (2006.01)
(Continued)

(52) U.S. Cl.
CPC .......... *B01J 23/22* (2013.01); *B01D 53/8628* (2013.01); *B01D 53/9418* (2013.01);
(Continued)

(58) Field of Classification Search
CPC .... B01J 37/0215; B01J 37/0236; B01J 37/08; B01J 37/031; B01J 37/04; B01J 37/002;
(Continued)

(56) References Cited

U.S. PATENT DOCUMENTS

| | | |
|---|---|---|
| 4,508,845 A | 4/1985 | Dromard et al. |
| 4,508,848 A | 4/1985 | Dolhyj et al. |

(Continued)

FOREIGN PATENT DOCUMENTS

| | | |
|---|---|---|
| CN | 101862651 | 10/2010 |
| CN | 102416334 | 4/2012 |

(Continued)

OTHER PUBLICATIONS

Berry et al (NPL: "Vanadium Antimonate", J. Chem. Soc. Dalton Trans, 1983, pp. 9-12).*

(Continued)

*Primary Examiner* — Smita S Patel
(74) *Attorney, Agent, or Firm* — Vincent Sica (57) ABSTRACT

A catalyst composition comprising—a support comprising $TiO_2$,—a composite oxide containing vanadium and antimony, which has a rutile-type structure different from $VSbO_4$ and $V_{0.92}Sb_{0.92}O_4$ as determined by X-ray diffraction (XRD) analysis with CuKα radiation, and—optionally, one or more selected from the group consisting of oxides of silicon, oxides of vanadium and oxides of antimony, for (Continued)

selective catalytic reduction of nitrogen oxides; to a process for preparing the catalyst composition, to the catalyst composition obtained/obtainable by the process and to use of the same for selective catalytic reduction of nitrogen oxides.

20 Claims, 4 Drawing Sheets (51) Int. Cl.

| | | |
|---|---|---|
| B01J 37/08 | (2006.01) | |
| B01J 37/02 | (2006.01) | |
| B01D 53/86 | (2006.01) | |
| B01J 37/00 | (2006.01) | |
| B01J 37/03 | (2006.01) | |
| B01J 23/00 | (2006.01) | |
| B01J 35/00 | (2006.01) | |
| B01J 37/04 | (2006.01) | |
| B01J 35/02 | (2006.01) | |
| B01J 21/06 | (2006.01) | |

(52) U.S. Cl.
CPC ........... B01J 23/002 (2013.01); B01J 35/002 (2013.01); B01J 37/0009 (2013.01); B01J 37/0215 (2013.01); B01J 37/0236 (2013.01); B01J 37/03 (2013.01); B01J 37/04 (2013.01); B01J 37/08 (2013.01); B01D 2251/2062 (2013.01); B01D 2255/2098 (2013.01); B01D 2255/20707 (2013.01); B01D 2255/20723 (2013.01); B01D 2255/30 (2013.01); B01D 2255/40 (2013.01); B01J 21/063 (2013.01); B01J 35/026 (2013.01); B01J 37/031 (2013.01); B01J 2523/00 (2013.01)

(58) Field of Classification Search
CPC .... B01J 37/0009; B01J 37/00; B01J 2523/00; B01J 2523/53; B01J 2523/47; B01J 2523/41; B01J 2523/55; B01J 23/22; B01J 23/002; B01J 23/00; B01J 23/20; B01J 23/18; B01J 23/16; B01J 37/03; B01J 21/063; B01D 2255/20723; B01D 2255/20707; B01D 2255/30; B01D 2255/2098; B01D 2255/40; B01D 53/8628; B01D 53/9418

See application file for complete search history.

(56) References Cited

U.S. PATENT DOCUMENTS

| | | | | |
|---|---|---|---|---|
| 2009/0143225 | A1* | 6/2009 | Ha | B01D 53/8628 502/247 |
| 2012/0087835 | A1 | 4/2012 | Trefzger et al. | |
| 2013/0040808 | A1* | 2/2013 | Schermanz | B01D 53/9418 502/242 |
| 2013/0205743 | A1 | 8/2013 | Sobolevskiy | |

FOREIGN PATENT DOCUMENTS

| | | |
|---|---|---|
| CN | 102527371 | 7/2012 |
| CN | 102821845 A | 12/2012 |
| CN | 104519998 | 4/2015 |
| CN | 104703694 A | 6/2015 |
| DE | 102012213639 A1 | 2/2013 |
| EP | 0686423 A3 | 7/1997 |
| WO | WO 2011-127505 | 10/2011 |
| WO | WO 2015/075083 | 5/2015 |

OTHER PUBLICATIONS

Ramli et al (NPL: Effect of vanadium and titanium substitution over an antimony based mixed oxide catalyst for propane ammoxidation to acrylonitrile, the Malaysian journal of analytical sciences, vol. 11, No. 1, 2007 pp. 166-172).*
Chinese office action issued in corresponding Application No. 201680081959.X, dated Nov. 24, 2020 (8 pages).
International search report in related International Application No. PCT/EP2014/075048, dated Feb. 2, 2015 (4 pages).

* cited by examiner

SELECTIVE CATALYTIC REDUCTION (SCR) CATALYST COMPRISING A COMPOSITE OXIDE CONTAINING V AND SB, PREPARATION PROCESS THEREOF, AND USE THEREOF FOR NITROGEN OXIDES REMOVAL

CROSS-REFERENCE TO RELATED APPLICATIONS

The present application is a U.S. National Stage of International Patent Application PCT/CN2016/091711, filed Jul. 26, 2016 and claims priority to International Patent Application No. PCT/CN2015/097704, filed Dec. 17, 2015. The disclosures of each of the applications noted above are incorporated herein by reference in their entirety.

TECHNICAL FIELD

Generally, the present invention relates to a catalyst for nitrogen oxides (NOx) removal. More specifically, the present invention relates to a selective catalytic reduction (SCR) catalyst containing vanadium and antimony on a support, preparation process thereof, and use thereof for NOx removal.

BACKGROUND

NOx emitted as exhaust gases from mobile source such as vehicles and stationary source such as a power plant would be harmful to environment and human beings. In order to remove NOx from exhaust gases, catalytic reducing methods have heretofore been developed. The catalytic reducing methods are suitable for dealing with large quantities of exhaust gases, and of these, a process comprising adding ammonia as a reducing agent to catalytically reduce NOx selectively to $N_2$ was reported to be superior. The catalysts used in such selective catalytic reduction (SCR) are required to reduce NOx over a broad temperature range and especially at a temperature as low as possible below 300° C.

SCR catalysts which are vanadium (V)/antimony (Sb) binary systems based on a support, such as V/Sb/$TiO_2$ have been disclosed, for example, in KR 101065242 B1, US 2009/143225 A1 and U.S. Pat. No. 4,221,768. It is believed that the incorporation of Sb as a promoter in conventional V-containing catalysts can result in improved SCR performance of the catalysts.

U.S. Pat. No. 8,975,206 B2 discloses a catalyst composition comprising a vanadate represented by $XVO_4$/S, in which $XVO_4$ stands for Bi-, Sb-, Ga- and/or Al-vanadate, and S is a support comprising $TiO_2$. Among others, $VSbO_4$ supported on $TiO_2$/$WO_3$/$SiO_2$ is given as an example, which is prepared by mixing V and Sb source solutions, drying at 120° C. and calcining at 550° C. for 20 hours to obtain $VSbO_4$ which is then supported on $TiO_2$/$WO_3$/$SiO_2$. No XRD pattern showing the structure of the vanadates, especially of $VSbO_4$ is disclosed in the patent.

WO 2013/179129 A2 discloses a SCR filter comprising a substrate in the form of a wall flow filter and a catalyst carried on said substrate, the catalyst comprising a support and a vanadate component. Said vanadate has a structure defined by the formula of $(A_x)(T_y)(R_z)VO_4$, wherein "A" is an alkaline earth metal, "T" is a transition metal, "R" is a rare earth metal, and "x", "y" and "z" are molar ratios of respective metals to vanadium with $0 \leq x \leq 1$, $0 \leq y \leq 1$, $0 \leq z \leq 1$ and $x+y+z=1$. This patent application only discloses $FeVO_4$ as the vanadate component. The SCR performance of the wall flow filter comprising $FeVO_4$ carried on the substrate is not discussed in the application.

In spite of the known SCR catalysts, there is still a need for SCR catalysts that exhibit excellent activity for NOx removal, especially in mobile and stationary exhaust gas emission applications.

SUMMARY OF THE INVENTION

An object of the present invention is to provide a novel SCR catalyst with improved NOx removal, especially in mobile and stationary exhaust gas emission applications. The object can be achieved by a catalyst composition, a method for the preparation thereof, use of the catalyst composition for selective catalytic reduction of nitrogen oxides. Particularly, the present invention relates to following aspects.

1. Use of a catalyst composition comprising:
a support comprising $TiO_2$,
a composite oxide containing vanadium and antimony, which has a rutile-type structure different from $VSbO_4$ and $V_{0.92}Sb_{0.92}O_4$ as determined by X-ray diffraction (XRD) analysis with CuKα radiation, and
optionally, one or more selected from the group consisting of oxides of silicon, oxides of vanadium and oxides of antimony,
for selective catalytic reduction of nitrogen oxides.

2. Use according to the above aspect 1, wherein the composite oxide containing vanadium and antimony is characterized by an XRD diffraction peak of (110) or (101) plane at higher 2θ than those of $VSbO_4$ and $V_{0.92}Sb_{0.92}O_4$ by at least 0.1°.

3. Use according to the above aspect 2, wherein the composite oxide containing vanadium and antimony is characterized by an XRD diffraction peak of (101) plane at higher 2θ than those of $VSbO_4$ and $V_{0.92}Sb_{0.92}O_4$ by at least 0.2°, preferably at least 0.3°, and more preferably at least 0.5°.

4. Use according to any of the above aspects 1 to 3, wherein the composite oxide containing vanadium and antimony is characterized by an XRD diffraction peak of (110) plane at 2θ in the range of from 27.25° to 29.00° and an XRD diffraction peak of (101) plane at 2θ in the range of from 35.43° to 37.00°.

5. Use according to any of the above aspects 1 to 4, wherein vanadium, including those in both the composite oxide vanadium and antimony and the optional oxide(s) of vanadium, is present in the catalyst composition in the range of 0.5 to 6% by weight, preferably 1 to 4.5% by weight, and more preferably 2 to 4% by weight, calculated as elemental V; and wherein antimony, including those in both the composite oxide vanadium and antimony and the optional oxide(s) of antimony, is present in the catalyst composition in the range of 0.8 to 16% by weight, preferably 3.5 to 14% by weight, and more preferably 5 to 10% by weight, calculated as elemental Sb.

6. Use according to any of the above aspects 1 to 5, wherein the catalyst composition is in a shaped form, preferably in form of extrudate, or is carried on a substrate.

7. Use according to the above aspect 1, wherein the nitrogen oxides are present in exhaust gases from an internal combustion engine such as diesel engine, a power plant or an incinerator.

8. A process for preparing the catalyst composition as defined in any of the above aspects 1 to 6, which includes steps of:

(i) mixing a vanadium/antimony oxide and optionally a silicon source with a support comprising $TiO_2$ in a solvent to obtain a suspension;
(ii) optionally, applying the suspension onto a substrate;
(iii) drying at a temperature in the range of 80 and 250° C.;
(iv) calcining at a temperature of at least 500° C.

9. The process according to the above aspect 8, wherein the calcining in step (iv) is conducted at a temperature in the range of higher than 500° C. to 700° C., more preferably 550° C. to 700° C., still preferably 600° C. to 700° C., and most preferably 650° C. to 700° C.

10. The process according to the above aspect 8 or 9, wherein the vanadium/antimony oxide used in step (i) is prepared by
(a) providing a suspension comprising vanadium oxide(s) and antimony oxide(s); and
(b) drying the suspension to obtain the vanadium/antimony oxide at a temperature in the range of 80° C. to 250° C.

11. The process according to the above aspect 8 or 9, wherein the vanadium/antimony oxide used in step (i) is prepared by
(a') providing a suspension or solution comprising a vanadium source and an antimony source;
(b') precipitating and separating the vanadium/antimony oxide from the suspension or solution; and
(c') optionally, drying at a temperature in the range of 80° C. to 250° C.

12. The process according to any of the above aspects 8 to 11, which does not comprise step (ii), and optionally comprises a step of shaping in order to obtain the catalyst composition in a shaped form.

13. A catalyst composition obtained/obtainable by the process according to any of the above aspects 8 to 12.

14. Use of the catalyst composition according to the above aspect 13 for selective catalytic reduction of nitrogen oxides.

15. Use according to the above aspect 14, wherein the nitrogen oxides are present in exhaust gases from an internal combustion engine such as diesel engine, a power plant or an incinerator.

DETAILED DESCRIPTION OF THE INVENTION

Catalyst Composition

The present invention provides a catalyst composition, comprising:
a support comprising $TiO_2$,
a composite oxide containing vanadium and antimony, which has a rutile-type structure different from $VSbO_4$ and $V_{0.92}Sb_{0.92}O_4$ as determined by X-ray diffraction (XRD) analysis with CuKα radiation, and
optionally, one or more selected from the group consisting of oxides of silicon, oxides of vanadium and oxides of antimony.

The support useful in the catalyst composition according to the present invention may be any supports comprising $TiO_2$. Preferably, the support consists of $TiO_2$, of $TiO_2$ and $SiO_2$, of $TiO_2$ and $WO_3$, of $TiO_2$ and $SiO_2$ and $WO_3$, of $TiO_2$ and $Al_2O_3$ or of $TiO_2$ and $ZrO_2$. More preferably, the support consists of $TiO_2$.

$TiO_2$ to be used in the present invention may be commercially available, or may be prepared via conventional processes known in the art. In a further embodiment according to the present invention, $TiO_2$ to be used in the present invention is in form of anatase.

In an embodiment, the composite oxide containing vanadium and antimony shows an XRD diffraction peak of (110) or (101) plane at higher 2θ value than those of rutile-type $VSbO_4$ and $V_{0.92}Sb_{0.92}O_4$ by at least 0.1°, preferably at least 0.2°, as determined by XRD analysis with CuKα radiation.

In the context of the present invention, any 2θ values of $VSbO_4$ and $V_{0.92}Sb_{0.92}O_4$ refer to those according to PDF 00-016-0600 for $VSbO_4$ and PDF 04-007-9467 for Ref $V_{0.92}Sb_{0.92}O_4$, as available from 2014 PDF4 Database, International Centre for Diffraction Data, Newtown Square, Pa., U.S.A.

The XRD diffraction analysis as used in the context of the present invention refers to XRD diffraction with CuKα radiation, unless mentioned otherwise.

In a preferable embodiment, the composite oxide containing vanadium and antimony shows an XRD diffraction peak of (101) plane at higher 2θ than those of $VSbO_4$ and $V_{0.92}Sb_{0.92}O_4$ by at least 0.1°, preferably at least 0.2°, more preferably at least 0.3°, even more preferably at least 0.5°, and most preferably at least 0.7°.

In a particularly preferable embodiment, the composite oxide containing vanadium and antimony is characterized by an XRD diffraction peak of (110) plane at 2θ in the range of from 27.25° to 29.00° and an XRD diffraction peak of (101) plane at 2θ in the range of from 35.43° to 37.00°.

Without being bound by any theories, it is assumed that the composite oxide containing vanadium and antimony may be represented by an empirical formula $VSb_aTi_bO_c$, in which a is the molar ratio of Sb to V and has a value of from more than 0 to less than 1, b is the molar ratio of Ti to V and has a value of 0 to less than 1, and c is the molar ratio of O to V and is determined by the valence requirements of the elements present. In a particular embodiment, titanium is present together with vanadium and antimony in the composite oxide having a rutile-type structure, i.e. b>0. In a further embodiment, the sum of the index a and the index b in formula $VSb_aTi_bO_c$ is ≤1.

In a further particular embodiment, the composite oxide containing vanadium and antimony does not contain silicon. In other words, silicon is not present in the rutile-type structure of the composite oxide.

The content of vanadium present in the catalyst composition according to the present invention, including those in both composite oxide containing vanadium and antimony and the optional oxide(s) of vanadium, is preferably in the range of 0.5 to 6% by weight, preferably 1 to 4.5% by weight, and more preferably 2 to 4% by weight, calculated as elemental V. The content of antimony present in the catalyst composition according to the present invention, including those in both composite oxide containing vanadium and antimony and the optional oxide(s) of antimony, is preferably in the range of 0.8 to 16% by weight, preferably 3.5 to 14% by weight, and more preferably 5 to 10% by weight, calculated as elemental Sb.

The content of silicon (if present) in the catalyst composition according to the present invention is preferably in the range of 0.2 to 9.5% by weight, preferably 0.4 to 7% by weight, more preferably 0.9 to 4.6% by weight, calculated as elemental Si.

The content of titanium calculated as $TiO_2$, including those present in the support and those possibly present in the composite oxide containing vanadium and antimony is preferably in the range of 50 to 97.5% by weight, preferably 61 to 93% by weight, and more preferably 73 to 90% by weight, based on the total weight of the catalyst composition according to the present invention.

The catalyst composition according to the present invention can be used in a powder form or in a shaped form. For example, catalyst composition according to the present invention may be shaped into beads, spheres, pellets, or crushed particles and the like, according to various techniques known in the art. It is to be understood that any conventional matrix materials or auxiliary agents may be incorporated during the shaping process as desired and thus may be comprised in the shaped form of the catalyst composition according to the present invention.

Alternatively, the catalyst composition according to the present invention may be applied on a substrate. The substrate is not particularly limited, and for example, a honeycomb substrate or a wall-flow substrate. The substrate may be any of those materials typically used for preparing catalysts, such as ceramic or metal.

In a preferable embodiment, the present invention provides a catalyst composition which is carried on a substrate as a washcoat, wherein the catalyst composition comprises:
a support comprising $TiO_2$,
a composite oxide containing vanadium and antimony, which has a rutile-type structure different from $VSbO_4$ and $V_{0.92}Sb_{0.92}O_4$ as determined by X-ray diffraction (XRD) analysis with CuKα radiation, and
optionally, one or more selected from the group consisting of oxides of silicon, oxides of vanadium and oxides of antimony.

In a preferable embodiment, the substrate comprises a ceramic or metal honeycomb structure. Any suitable substrate may be employed, such as a monolithic substrate of the type having fine, parallel gas flow passages extending therethrough from an inlet or an outlet face of the substrate. The passages, which are essentially straight paths from their fluid inlet to their fluid outlet, are defined by walls on which the catalyst composition is carried as a washcoat so that the gases flowing through the passages contact the catalyst composition. The flow passages of the monolithic substrate are thin-walled channels, which can be of any suitable cross-sectional shape and size such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrate may have from about 50 to 600, more usually from about 200 to 400, cells per square inch ("cpsi"). The cells can have cross sections that are rectangular, square, circular, oval, triangular, hexagonal, or are of other polygonal shapes.

Preferably, the catalyst composition may be loaded on the substrate in an amount of 1-10 $g/in^3$, and preferably 1-7 $g/in^3$, and more preferably 2-5.5 $g/in^3$.

The catalyst composition according to the present invention can be used for reducing nitrogen oxides (NOx), especially in exhaust gas from an internal combustion engine or from power plant, as described hereinafter.

It is to be understood that the contents of the support and the components in each case are calculated relative to the total weight of the catalyst composition according to the present invention, the substrate if present being not included in the said total weight, unless mentioned otherwise.

Process for Preparing the Catalyst Composition

In a further aspect of the invention, a process for preparing the catalyst composition according to the present invention is provided, which includes steps of:
(i) mixing a vanadium/antimony oxide and optionally a silicon source with a support comprising $TiO_2$ in a solvent to obtain a suspension;
(ii) optionally, applying the suspension onto a substrate;
(iii) drying at a temperature in the range of 80 and 250° C.;
(iv) calcining at a temperature of at least 500° C.

In the context of the invention, the vanadium/antimony oxide is intended to mean a mixture of vanadium oxide(s) and antimony oxide(s), an oxide of vanadium and antimony, or a combination of an oxide(s) of vanadium and antimony with a mixture of vanadium oxide(s) and antimony oxide(s).

In the process according to the present invention, the silicon source, when used, is not particularly limited, preferably selected from the group consisting of silicic acid, silica sol, quartz, fused or amorphous silica, silicates such as sodium silicate, alkoxysilanes, silicone resins, etc. or a combination of any two or more thereof.

The description hereinabove as to the support for the catalyst composition applies to the process according to the present invention.

In an embodiment of the process according to the present invention, the vanadium/antimony oxide used in step (i) is prepared by
(a) providing a suspension comprising vanadium oxide(s) and antimony oxide(s); and
(b) drying the suspension to obtain the vanadium/antimony oxide at a temperature in the range of 80° C. to 250° C.

In this embodiment, the vanadium oxide(s) and antimony oxide(s) used in step a) are not particularly limited, for example $V_2O_5$ and $Sb_2O_3$ can be used.

In a further embodiment of the process according to the present invention, the vanadium/antimony oxide used in step (i) is prepared by
(a') providing a suspension or solution comprising a vanadium source and an antimony source;
(b') precipitating and separating the vanadium/antimony oxide from the suspension or solution; and
(c') optionally, drying at a temperature in the range of 80° C. to 250° C.

In the context of the invention, the vanadium source and antimony source are intended to mean compounds containing vanadium and compounds containing antimony, respectively, which may be converted to the vanadium/antimony oxide in the process.

In this embodiment, the vanadium source is preferably selected from the group consisting of ammonium vanadate, vanadyl oxalate, vanadium pentoxide, vanadium monoethanolamine, vanadium chloride, vanadium trichloride oxide, vanadyl sulfate, vanadium antimonite, vanadium antimonate and vanadium oxides. The antimony source is preferably selected from the group consisting of antimony acetate, ethylene glycol antimony, antimony sulfate, antimony nitrate, antimony chloride, antimonous sulfide, antimony oxides and antimony vanadate.

In the process according to the present invention, the solvent used in step (i) and the solvent in the suspension or solution in step (a) and (a') independently of each other, may be any suitable solvents known in the art, preferably a solvent comprising water, preferably the solvent being DI water.

In step (ii) of the process according to the present invention, the suspension is optionally applied onto the substrate by any methods known in the art. For example, the lower end of the substrate may be dipped into the suspension, and vacuum is applied to the upper end of the substrate, so that the suspension is drawn into the passages of the substrate to a desired length. The description hereinabove as to the substrate to carry the catalyst composition applies to the process according to the present invention.

In step (iii) of the process according to the present invention, the suspension from step (i) or the obtained substrate from step (ii) is dried at a temperature in the range of 80° C. to 250° C., preferably 100° C. to 200° C., more preferably 100° C. to 150° C. The drying can be conducted in any ways known in the art without particular limitations.

The preferable temperature ranges discussed above are also applicable to step (b) and step (c') in respective embodiments of the process according to the present invention. The drying in those steps can also be conducted in any ways known in the art without particular limitations, with spray drying being preferable.

In step (iv) of the process according to the present invention, the calcining is preferably conducted at a temperature in the range of 500° C. to 700° C., preferably in the range of higher than 500° C. to 700° C., more preferably 550° C. to 700° C., even more preferably 600° C. to 700° C., and most preferably 650° C. to 700° C.

According to an embodiment of the process according to the present invention, if appropriate, the precipitating in step (b') is conducted in the presence of a precipitator, e.g., ammonia, ammonium bicarbonate, ammonium carbonate, sodium hydroxide, potassium hydroxide, sodium carbonate, and etc.

Any other conventional additives such as dispersant, binder and/or thickener may be used during the process according to the present invention, if desired.

In a further embodiment, the process according to the present invention does not comprise applying the suspension from step (i) onto a substrate, which optionally comprises a step of shaping instead in order to obtain the catalyst composition in a shaped form. Shaping, when desired, is carried out before the calcining step (iv), preferably before the drying step (iii). It is to be understood that any conventional matrix materials or auxiliary agents may be incorporated during the shaping process as desired.

Method for Selective Catalytic Reduction of Nitrogen Oxides (NOx) in Exhaust Gas In a further aspect, the present invention relates to use of the catalyst composition according to the present invention or the catalyst composition obtained/obtainable by the process according to the present invention for selective catalytic reduction of NOx, especially in exhaust gases.

The exhaust gases which can be treated by the catalyst composition according to the present invention or the catalyst composition obtained/obtainable by the process according to the present invention are any exhaust gases containing NOx to be removed or reduced. The exhaust gases are from for example, but not limited to an internal combustion engine, a power plant or an incinerator.

Accordingly, a method for reducing NOx in exhaust gas from an internal combustion engine is provided, comprising contacting the exhaust gas with the catalyst composition according to the present invention or the catalyst composition obtained/obtainable by the process according to the present invention.

In a particular embodiment, the exhaust gases are contacted with the catalyst composition according to the present invention or the catalyst composition obtained/obtainable by the process according to the present invention at a temperature in the range of 150° C. to 650° C., or 180 to 600° C., or 200 to 550° C.

The contact of the exhaust gases with the catalyst composition according to the present invention or the catalyst composition obtained/obtainable by the process according to the present invention is conducted in the presence of a reductant. The reductant that can be used in the present invention may be any reductants known in the art per se for reducing NOx, for example $NH_3$. $NH_3$ may be derived from urea.

There may be other catalyst(s) upstream or downstream in the flow direction of the exhaust gases.

In a preferred embodiment of the invention, the internal combustion engine is a diesel engine.

The invention will be further illustrated by the following Examples, which set forth particularly advantageous embodiments. While the Examples are provided to illustrate the present invention, they are not intended to limit it.

EXAMPLES

Preparation of Vanadium/Antimony Oxide—Compound 1

40.0 g $V_2O_5$ and 64.1 g $Sb_2O_3$ were mixed in 300 g DI water, and agitated to form a suspension. This suspension was spray dried at 200° C. to form a mixture of oxides with a molar ratio V:Sb of 1:1.

Example 1

10.4 g Compound 1 was added in 100.0 g DI water, and then stirred for 30 min, followed by addition of 84.6 g $TiO_2$ powder and 16.7 g aqueous colloidal $SiO_2$ solution (30% $SiO_2$ solid). The thus-obtained suspension was applied onto a 400/6 honeycomb cordierite substrate (with number 400 referring to cells per square inch (cpsi) and 6 referring to wall thickness between channels in mils), dried at a temperature of 120° C. overnight, followed by calcination at 500° C. for 3 h in air. After cooling to room temperature, Catalyst 1 was obtained. The total loading of washcoat on the substrate is 3.0 g/in$^3$.

Example 2

Example 1 was repeated, except that the calcination was carried out at 650° C. for 3 h to obtain Catalyst 2.

Example 3

Example 1 was repeated, except that the calcination was carried out at 700° C. for 3 h to obtain Catalyst 3.

Example 4

13.0 g Compound 1 was added in 100.0 g DI water, and then stirred for 30 min, followed by addition of 82.0 g $TiO_2$ powder and 16.7 g aqueous colloidal $SiO_2$ solution (30% $SiO_2$ solid). The thus-obtained suspension was applied onto a 400/6 cpsi honeycomb cordierite substrate, dried at a temperature of 120° C. overnight, followed by calcination at 500° C. for 3 h in air. After cooling to room temperature, Catalyst 4 was obtained. The total loading of washcoat on the substrate is 3.0 g/in$^3$.

Example 5

Example 4 was repeated, except that the calcination was carried out at 650° C. for 3 h to obtain Catalyst 5.

Example 6

Example 4 was repeated, except that the calcination was carried out at 700° C. for 3 h to obtain Catalyst 6.

Figure 1:
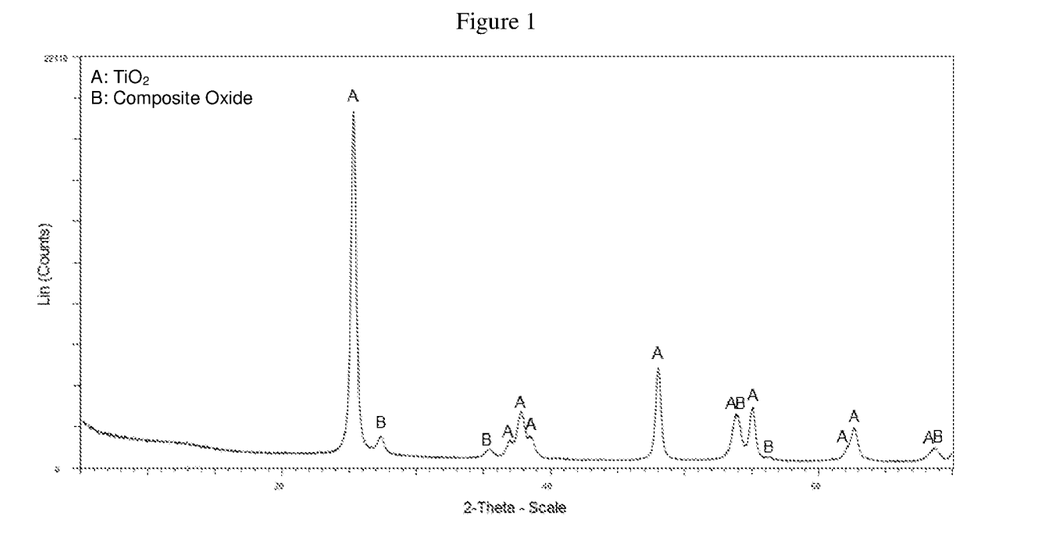
FIG. 1 shows an XRD pattern of a catalyst composition as prepared in Example 1 according to the present invention.
Figure 2:
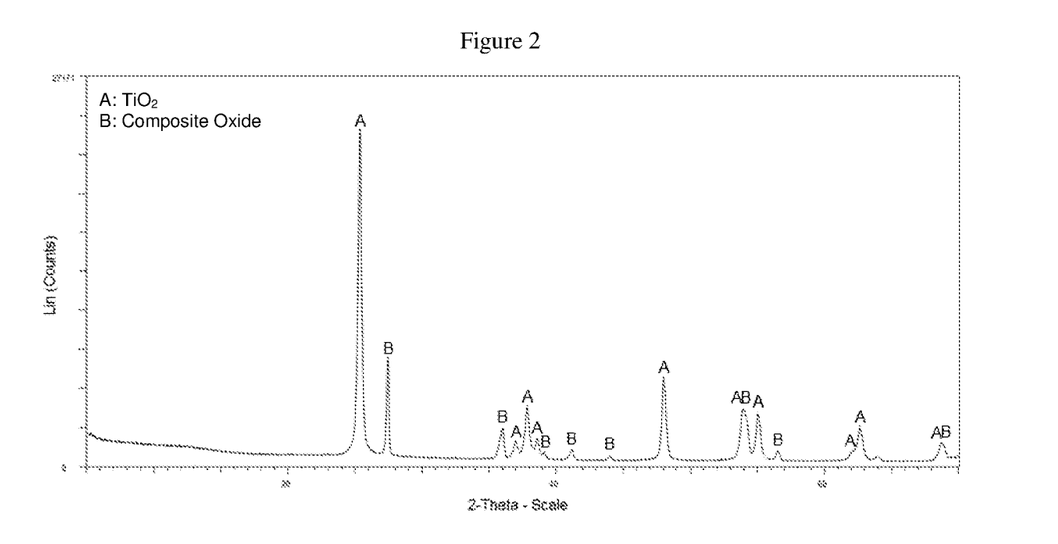
FIG. 2 shows an XRD pattern of a catalyst composition as prepared in Example 2 according to the present invention.
Figure 3:
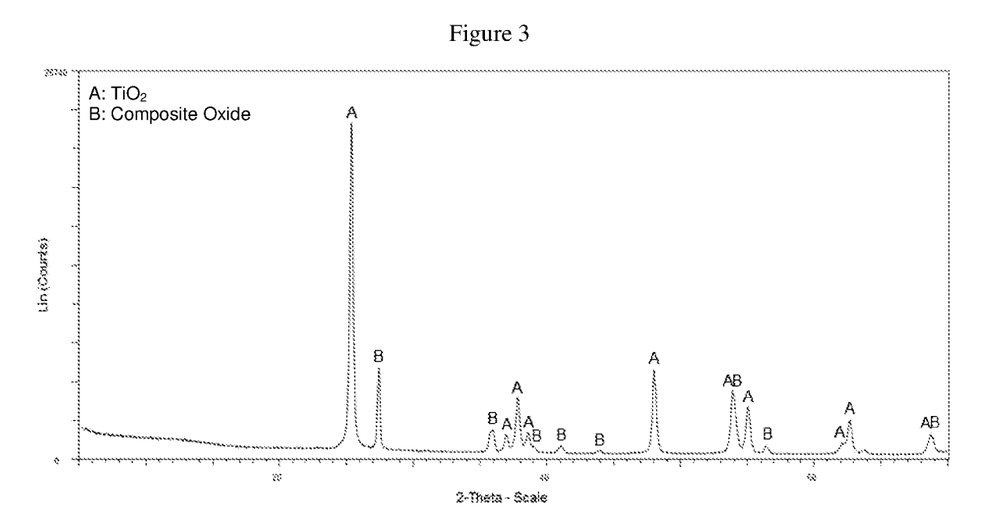
FIG. 3 shows an XRD pattern of a catalyst composition as prepared in Example 3 according to the present invention.

The washcoats of Catalysts 1 to 3 as obtained in the above Examples were characterized by XRD analysis with CuKα radiation, step size 0.02°, D8 Advance Series II, Bruker AXS GmbH. The XRD patterns of Catalysts 1, 2 and 3 are shown in FIGS. 1, 2 and 3 respectively. The rutile-type structure's XRD data together with cell parameters of the washcoats of Catalysts 1 to 3 and those of $V_{0.92}Sb_{0.92}O_4$ and $VSbO_4$ are summarized in Table 1.

TABLE 1

XRD data of $VSbO_4$ and $V_{0.92}Sb_{0.92}O_4$ and of the washcoats of Catalysts 1 to 3

| Samples | Rutile-related 2θ (°) (110) | Rutile-related 2θ (°) (101) | Rutile-related a (Å) | Rutile-related c (Å) | TiO$_2$ anatase 2θ (°) (101) |
|---|---|---|---|---|---|
| Ref. $VSbO_4$ (PDF: 00-016-0600)* | 27.420 | 35.093 | 4.598 | 3.078 | Not applicable |
| Ref. $V_{0.92}Sb_{0.92}O_4$ (PDF: 04-007-9467)* | 27.267 | 35.329 | 4.622 | 3.038 | Not applicable |
| Catalyst 1 (500° C./3 h) | 27.306 | 35.375 | 4.615 | 3.034 | 25.30 |
| Catalyst 2 (650° C./3 h) | 27.434 | 36.025 | 4.594 | 2.965 | 25.29 |
| Catalyst 3 (700° C./3 h) | 27.349 | 35.863 | 4.608 | 2.979 | 25.29 |

*2014 PDF4 Database, International Centre for Diffraction Data, Newtown Square, Pennsylvania, U.S.A.

The 2θ values of TiO$_2$ anatase (101) plane are the same among Catalysts 1 to 3, and consistent with the known 2θ values of TiO$_2$ anatase (101) plane. It is believed that the XRD patterns and data regarding the rutile-type structures of the Catalysts 1 to 3 are reliable.

It can be seen from the XRD patterns shown in FIGS. 1 to 3 and the data given in Table 1, the washcoat of Catalyst 1 shows similar XRD diffractions (2θ values) and cell parameters (a, c values) to Ref. $V_{0.92}Sb_{0.92}O_4$. In contrast, diffraction peaks of (101) planes of the washcoats of Catalyst 2 and Catalyst 3 shift to higher 2θ values than those of Ref $VSbO_4$ and Ref $V_{0.92}Sb_{0.92}O_4$ by at least 0.5°, and the rutile-related parameter c values for Catalyst 2 and Catalyst 3 are clearly smaller than Ref $VSbO_4$ and Ref $V_{0.92}Sb_{0.92}O_4$. It shows that Catalyst 2 and Catalyst 3 contain a TiO$_2$ anatase structure and a composite oxide rutile-type structure different from $V_{0.92}Sb_{0.92}O_4$ and $VSbO_4$.

Figure 4:
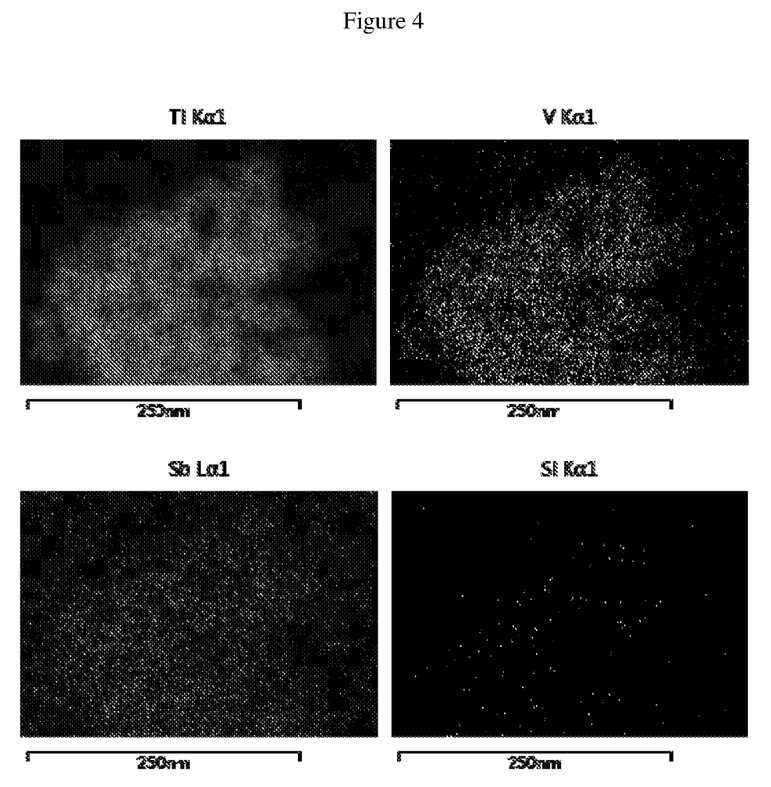
FIG. 4 shows an STEM-EDS image of a catalyst composition as prepared in Example 2 according to the present invention.

Catalyst 2 was also analyzed by Scanning Transmission Electron Microscopy—Energy Dispersive Spectroscopy (STEM-EDS), with FEI Magellan 400 Scanning Electron Microscope, FEI Company, coupled with an X-Max$^N$ 80 mm$^2$ EDS Detector, Oxford Instruments. A sample was dispersed ultrasonically in ethanol, dropped onto a copper web covered with carbon film, and then subjected to STEM microscopic structure analysis under a voltage of 30 kV. The STEM-EDS image as shown in FIG. 4 depicts distributions of V and Sb over TiO$_2$ are almost the same while distribution of SiO$_2$ is different or independent. This suggests that Si is not incorporated in the rutile-type structure.

SCR Activity Test of Catalysts 1 to 6

Catalysts 1 to 6 were tested for NOx removal in terms of SCR activity. All the catalysts were placed in the fixed bed lab simulator for testing. 7 g catalyst in cylinder shape with diameter of 1 inch and length of 3 inch was used in each testing. The feed gas consists of 500 ppm NH$_3$, 500 ppm NO, 5% H$_2$O, 10% O$_2$ and a balance of N$_2$. Space velocity is 60,000 h$^{-1}$. The activity test results are summarized in Table 2.

TABLE 2

SCR activity of the catalysts

| Catalysts | NOx conversion @250° C., % |
|---|---|
| 1 (500° C./3 h) | 16.7 |
| 2 (650° C./3 h) | 73.9 |
| 3 (700° C./3 h) | 78.5 |
| 4 (500° C./3 h) | 21.7 |
| 5 (650° C./3 h) | 83.6 |
| 6 (700° C./3 h) | 50.4 |

TABLE 2-continued

SCR activity of the catalysts

| Catalysts | NOx conversion @250° C., % |
|---|---|

Catalysts 1 to 3 were prepared from the same starting material formulation and differ from each other only in the calcination temperature during the preparation. It can be seen that Catalysts 2 and 3 obtained under higher calcination temperatures (650° C. and 700° C., respectively) showed significantly higher NOx conversion, compared with Catalyst 1. It is assumed that Catalysts obtained under a calcination temperature higher than 500° C. contain the composite oxide having a rutile-type structure different from $V_{0.92}Sb_{0.92}O_4$ and $VSbO_4$ as characterized by XRD analysis. Comparisons of Catalysts 4 vs. 5 and 6 also show the positive effect of the composite oxide obtained under higher calcination temperatures on the SCR activity of the catalysts.

Comparative Examples

For comparison, more catalyst compositions were prepared.

Comparative Example 1

10.4 g Compound 1 which has been pre-treated at 550° C. for 20 h was added in 100.0 g DI water, and then stirred for 30 min, followed by addition of 84.6 g $TiO_2$ powder and 16.7 g aqueous colloidal $SiO_2$ solution (30% $SiO_2$ solid). The thus-obtained suspension was applied onto a 400/6 honeycomb cordierite substrate, dried at a temperature of 120° C. overnight, followed by calcination at 650° C. for 3 h in air. After cooling to room temperature, Comparative Catalyst 1 was obtained. The total loading of washcoat on the substrate is 3.0 g/in³.

Comparative Example 2

Comparative Example 1 was repeated, except that the calcination was carried out at 700° C. for 3 h, to obtain Comparative Catalyst 2.

Comparative Example 3

In a typical synthetic process, 22.73 g vanadyl oxalate solution (11% $V_2O_5$ solid) was added in 100.0 g DI water, and then mixed with 16.7 g aqueous colloidal $SiO_2$ solution (30% $SiO_2$ solid). The mixture was stirred for 30 min, followed by addition of 92.5 g $WO_3/TiO_2$ powder. The resulting paste was diluted by DI water. Then the thus-obtained slurry was coated onto a 400/6 honeycomb cordierite substrate, and dried at 120° C. overnight, followed by calcination at 450° C. for 3 h in air. After cooling to room temperature, Comparative Catalyst 3 was obtained.

SCR Activity Test of Comparative Catalysts 1 to 6

The Comparative Catalysts were tested via the procedure as described above and the activity test results are summarized in Table 3.

TABLE 3

SCR activity of the Comparative Examples

| Comparative Catalysts | NOx Conversion @ 250° C., % |
|---|---|
| 1 (pre-treatment @550° C./20 h and calcination @650° C./3 h) | 54.1 |
| 2 (pre-treatment @550° C./20 h and calcination @700° C./3 h) | 65.1 |
| 3 ($V_2O_5/SiO_2$ supported on $WO_3/TiO_2$) | 73.5 |

The preparation of Comparative Catalyst 1 differs from the preparation of Catalyst 2 only in that Compound 1 was pre-treated at a temperature of 550° C. for 20 h before mixed with other components. Catalyst 2 shows much higher NOx conversion than Comparative Catalyst 1. Similarly, Catalyst 3 showed higher NOx conversion than Comparative Catalyst 2. It is assumed that $TiO_2$ as the support facilitates or participates in the formation of the composite oxide containing vanadium and antimony during a high temperature calcination, which composite oxide allow improved SCR activity of the catalyst composition.

Furthermore, the catalyst composition according to the present invention or the catalyst composition obtained/obtainable by the process according to the present invention even showed superior performance in terms of SCR activity to the Comparative Catalyst 3, which is a typical commercially available SCR catalyst.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A catalyst composition comprising:
 a support comprising $TiO_2$,
 a composite oxide containing vanadium and antimony, which has a rutile-base structure different from $VSbO_4$ and $V_{0.92}Sb_{0.92}O_4$ as determined by X-ray diffraction (XRD) analysis with Cu Kα radiation, and
 optionally, one or more selected from the group consisting of oxides of silicon, oxides of vanadium, and oxides of antimony,
 wherein the catalyst composition is capable of selective catalytic reduction of nitrogen oxides.

2. The catalyst composition according to claim 1, wherein the composite oxide containing vanadium and antimony is characterized by an XRD diffraction peak of (110) or (101) plane at higher 2θ than those of $VSbO_4$ and $V_{0.92}Sb_{0.92}O_4$ by at least 0.1°.

3. The catalyst composition according to claim 2, wherein the composite oxide containing vanadium and antimony is characterized by an XRD diffraction peak of (101) plane at higher 2θ than those of $VSbO_4$ and $V_{0.92}Sb_{0.92}O_4$ by at least 0.2°.

4. The catalyst composition according to claim 3, wherein the composite oxide containing vanadium and antimony is characterized by an XRD diffraction peak of (101) plane at higher 2θ than those of $VSbO_4$ and $V_{0.92}Sb_{0.92}O_4$ by at least 0.5°.

5. The catalyst composition according to claim 1, wherein the composite oxide containing vanadium and antimony is characterized by an XRD diffraction peak of (110) plane at 2θ in the range of from 27.25° to 29.00° and an XRD diffraction peak of (101) plane at 2θ in the range of from 35.43° to 37.00°.

6. The catalyst composition according to claim 1, wherein vanadium, including those in both the composite oxide containing vanadium and antimony and the optional oxides of vanadium, is present in the catalyst composition in the range of 0.5% to 6% by weight, calculated as elemental V; and wherein antimony, including those in both the composite oxide containing vanadium and antimony and the optional oxides of antimony, is present in the catalyst composition in the range of 0.8% to 16% by weight, calculated as elemental Sb.

7. The catalyst composition according to claim 6, wherein vanadium, including those in both the composite oxide containing vanadium and antimony and the optional oxides of vanadium, is present in the catalyst composition in the range of 1% to 4.5% by weight, calculated as elemental V.

8. The catalyst composition according to claim 6, wherein vanadium, including those in both the composite oxide containing vanadium and antimony and the optional oxides of vanadium, is present in the catalyst composition in the range of 2% to 4% by weight, calculated as elemental V.

9. The catalyst composition according to claim 6, wherein antimony, including those in both the composite oxide containing vanadium and antimony and the optional oxides of antimony, is present in the catalyst composition in the range of 3.5% to 14% by weight, calculated as elemental Sb.

10. The catalyst composition according to claim 6, wherein antimony, including those in both the composite oxide containing vanadium and antimony and the optional oxides of antimony, is present in the catalyst composition in the range of 5% to 10% by weight, calculated as elemental Sb.

11. The catalyst composition according to claim 1, wherein the catalyst composition is in a shaped form or is carried on a substrate.

12. The catalyst composition according to claim 11, wherein the catalyst composition is in the shaped form of extrudate.

13. The catalyst composition according to claim 1, wherein the nitrogen oxides are present in exhaust gases from an internal combustion engine, a power plant, or an incinerator.

14. The catalyst composition according to claim 13, wherein the internal combustion engine is a diesel engine.

15. A process for preparing the catalyst composition as defined in claim 1, which includes steps of:
  (i) mixing a vanadium/antimony oxide and optionally a silicon source with the support comprising $TiO_2$ in a solvent to obtain a suspension;
  (ii) optionally, applying the suspension onto a substrate;
  (iii) drying at a temperature in the range of 80 and 250° C.; and
  (iv) calcining at a temperature of at least 500° C.

16. The process according to claim 15, wherein the calcining in step (iv) is conducted at a temperature in the range of 500° C. to 700° C.

17. The process according to claim 16, wherein the calcining in step (iv) is conducted at a temperature in the range of 550° C. to 700° C.

18. The process according to claim 15, wherein the vanadium/antimony oxide used in step (i) is prepared by
  (a) providing a suspension comprising vanadium oxide and antimony oxide; and
  (b) drying the suspension to obtain the vanadium/antimony oxide at a temperature in the range of 80° C. to 250° C.

19. The process according to claim 15, wherein the vanadium/antimony oxide used in step (i) is prepared by
  (a') providing a suspension or solution comprising a vanadium source and an antimony source;
  (b') precipitating and separating the vanadium/antimony oxide from the suspension or solution; and
  (c') optionally, drying at a temperature in the range of 80° C. to 250° C.

20. The process according to claim 15, which does not comprise step (ii), and optionally comprises a step of shaping in order to obtain the catalyst composition in a shaped form.

* * * * *